United States Patent [19]
Jonischkeit et al.

[11] Patent Number: 5,720,569
[45] Date of Patent: Feb. 24, 1998

[54] APPARATUS WITH A FASTENING MEMBER SECURED TO A BODY AGAINST FALLING

[75] Inventors: Michael Jonischkeit, Grafing; Karl Maslo, Grasbrunn/Neu Keferloh, both of Germany

[73] Assignee: Sachtler Aktiengesellschaft Kommunikationstechnik, Unterschleissheim, Germany

[21] Appl. No.: 521,110

[22] Filed: Aug. 29, 1995

[30] Foreign Application Priority Data

Aug. 31, 1994 [DE] Germany ............... 44 30 975.9

[51] Int. Cl.$^6$ ............................................. F16B 7/10
[52] U.S. Cl. ........................ 403/109; 403/315; 403/316
[58] Field of Search ............................. 403/109, 315, 403/316

[56] References Cited

U.S. PATENT DOCUMENTS

| | | | |
|---|---|---|---|
| 203,260 | 5/1878 | Gilmore | 403/109 X |
| 966,455 | 8/1910 | Life | 366/247 |
| 1,811,880 | 6/1931 | Dina | 403/109 X |
| 1,918,519 | 7/1933 | Clements | 403/109 X |
| 2,179,415 | 11/1939 | Mace | 403/109 |
| 2,205,846 | 6/1940 | Courtney | 403/109 X |
| 2,215,371 | 9/1940 | Horton | 403/109 X |
| 2,618,285 | 11/1952 | Heisig | 403/109 X |
| 2,652,272 | 9/1953 | Wood | 403/109 X |
| 2,693,255 | 11/1954 | Dicke et al. | 403/316 X |
| 3,945,738 | 3/1976 | Bahnsen | 403/109 |
| 4,441,836 | 4/1984 | Boda | 403/316 X |
| 4,587,864 | 5/1986 | Kassai | 403/109 X |
| 4,783,034 | 11/1988 | Ostrander et al. | 403/316 X |
| 5,385,323 | 1/1995 | Garelick | 403/109 X |

FOREIGN PATENT DOCUMENTS

| | | | |
|---|---|---|---|
| 2678352 | 12/1992 | France . | |
| 1086952 | 8/1960 | Germany . | |
| 62209 | 6/1968 | Germany | 403/316 |
| 3209820 | 9/1983 | Germany . | |

*Primary Examiner*—Kenneth J. Dorner
*Assistant Examiner*—Andrea Chop
*Attorney, Agent, or Firm*—Dilworth & Barrese

[57] ABSTRACT

An apparatus with a fastening member secured to a body against falling down, for example a winged screw (14) which, with interposition of a holding plate (30), is connected by threads through a so-called keyhole opening (36) to the body (22) of a mounting (10), in particular for holding a spotlight, the holding plate (30) securing the winged screw (14) against falling out but making a repositioning of the winged screw (14) for a different fastening position possible, for which purpose the holding plate is displaceably held on the mounting.

21 Claims, 2 Drawing Sheets

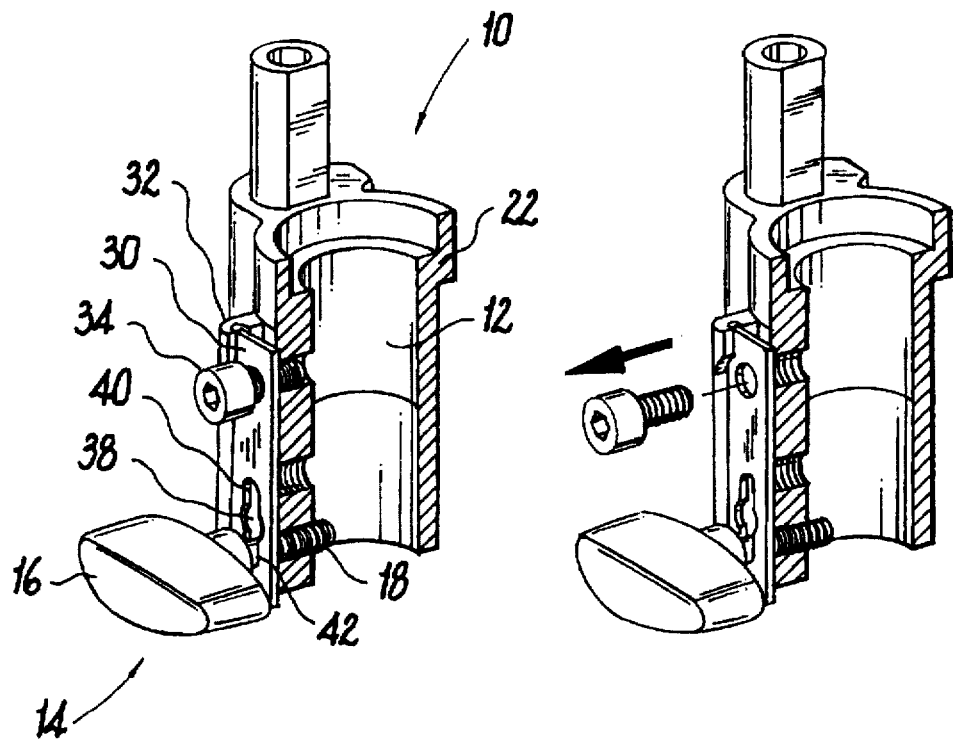
Fig. 1a  Fig. 1b
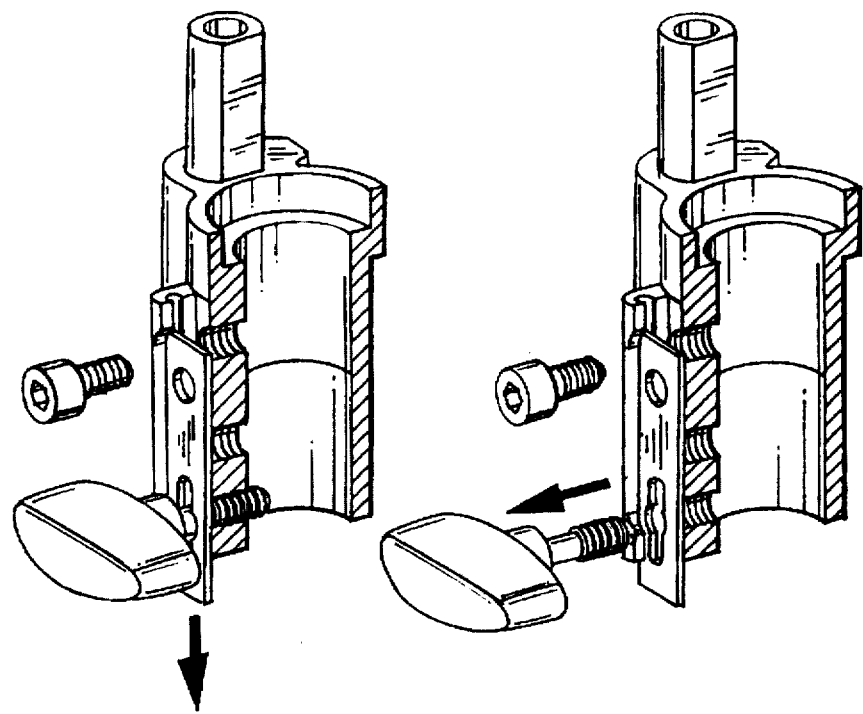
Fig. 1c  Fig. 1d

APPARATUS WITH A FASTENING MEMBER SECURED TO A BODY AGAINST FALLING

BACKGROUND OF THE INVENTION

The invention relates to an apparatus comprising a fastening member secured to a body against falling down.

When an object such as a spotlight in a recording studio is fixed in its location in a mounting by means of a fastening screw, then one preferably uses such a screw for fixing which can be handled without a tool, for example a winged screw. Such spotlights and their mounting are positioned from the ground in their elevated position with a manipulation rod in order to relocate the spotlight from the ground in terms of its vertical or horizontal position. This can lead to an unintentional release of the fastening screw or other fastening member when unintentionally acting on the operating part of the fastening screw by means of the manipulation rod. This can also occur during transport or handling on the ground. Thus, the fastening screw can fall from the elevated position onto persons standing beneath this mounting and injure them. The fastening screw can also be lost during handling. Therefore, this fastening screw should be secured particularly against falling down. This is usually achieved by means of a holding wire although this is awkward in functional terms and with respect to its application, but even more, it makes handling of the fastening screw more difficult.

Additionally, to locate the spotlight in another fastening position, it is necessary to change the position of the fastening screw to secure the spotlight. For example, this occurs once when adapting to different standards, for example to secure the spotlight against rotation in the mounting. According to FR-26 78 352, the screw to be secured penetrates a keyhole-like opening of a plate and is held on this by means of a caoutchouc perforated disc which sits between the head of the screw and the thread and has a hole diameter which is smaller than the thread diameter.

SUMMARY OF THE INVENTION

It is therefore the object of the invention to develop an apparatus of the type initially mentioned to the extent that the safety device for securing the fastening member against falling is simply constructed, that the handling of the fastening member operated without a tool is simplified and, additionally, that a change in position of the fastening member is possible with simple means.

This object is solved in accordance with the invention by the features herein.

The holding part according to the invention not only prevents an unintentional falling of the fastening member from the elevated position. There is also no necessity to secure a wire to the fastening screw so that an unhindered operation of the fastening screw is possible. The possibility to change the location of the holding part additionally makes a simple shifting of the fastening member possible, for example to secure a spotlight when adapting this to another standard within the mounting.

Preferably, the fastening member is a screw and in particular a fastening screw which is releasable without using a tool, for example a winged screw. This makes a quick fastening of the object possible, for example of the spotlight in the mounting without having to use a tool for this purpose, wherein the fastening element for the holding part can be a screw to be fastened itself with a tool, as this is commonly done on the ground for a repositioning operation and falling of this screw is therefore not to be feared. This screw cannot be loosened in the elevated position by the previously mentioned manipulation rod.

The holding part is preferably formed as an oblong holding plate.

According to a particularly advantageous embodiment, the holding plate has a fastening hole for inserting a fastening screw, which acts to hold the holding plate on the body, and also has at least one insertion hole, the diameter of which is adapted to the outer thread diameter of the fastening screw so that the fastening screw can be inserted with the threaded part through this hole. At least one oblong hole of a smaller cross section than the outer thread diameter of the fastening screw borders on the insertion hole. The holding plate is mounted on the body to be displaceable transversely to the hole axis and threaded bores of the body are correlated with the holes of the holding plate at spacings of a corresponding correlation. After releasing the positioning screw, by simple displacement, the hole of larger cross section can be made flush with the threaded section of the fastening screw so that the fastening screw can be removed through the hole of larger diameter. After this, the holding plate with the hole of larger diameter can be made flush with another threaded bore of the body, following which the holding plate with the oblong hole of smaller cross section can be pushed over the shaft between the threaded section and the actuating part of the screw and the holding plate can then be positioned with the positioning screw. This permits a simple adaptation of the securing system to another object to be secured in the mounting, for example, a different spotlight.

BRIEF DESCRIPTION OF THE DRAWINGS

The invention is explained in more detail in the following with reference to an exemplary embodiment schematically shown in the drawings, in which:

FIG. 1a shows a perspective sectional view of a mounting for a spotlight with a fastening screw and a holding plate in the fastened state; and FIG. 1b–1h show the individual states for releasing the fastened arrangement and the holding plate to readjust the holding plate and fasten a different spotlight, FIG. 1h showing the fastened state in the other position.

DESCRIPTION OF THE PREFERRED EMBODIMENTS

Figure 1E:
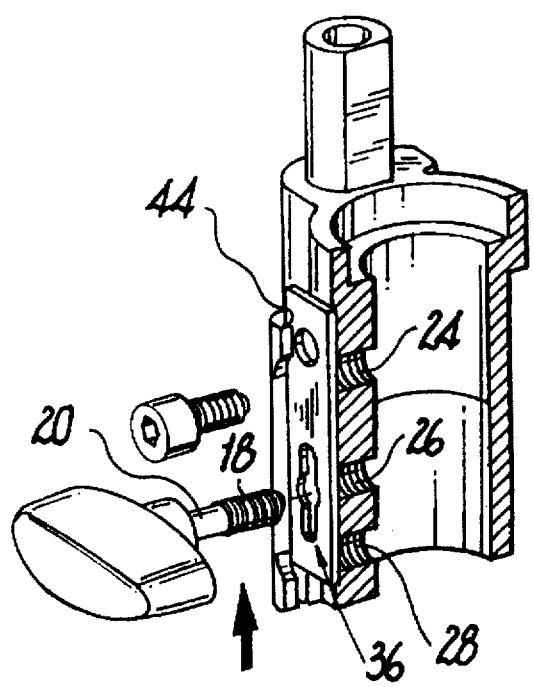
Figure 1F:
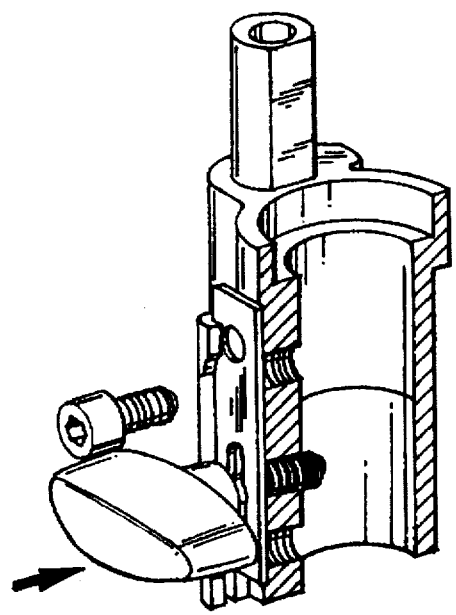
Figure 1G:
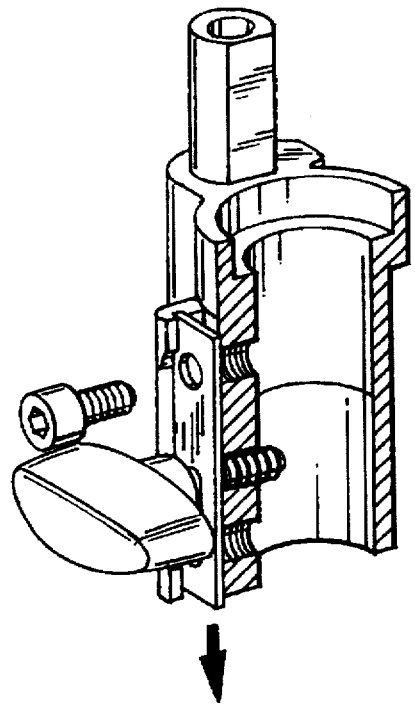

FIG. 1a shows a perspective view, sectioned in half, of a mounting 10 for a spotlight with a receiving bore 12 for an appropriate part of a spotlight. The fixing in the bore 12 of this part of the spotlight, which is not shown, ensues by means of a winged screw 14 which can be screwed in and out without a tool and is provided for this purpose with a winged actuated part 16. This winged screw 14 is provided with a threaded section 18 (body-sided part). There is a shaft 20 between the actuated part 16 and the threaded section 18 which has a smaller diameter than the outer diameter of the threaded section 18 (this can also be clearly seen in FIG. 1e). The mounting 10 is formed by a body 22 which is provided with threaded bores 24, 26, 28. The threaded bores 26 and 28 serve to secure different spotlights in the mounting. The threaded bore 24 serves to position a holding plate 30 which is displaceably arranged within a guide 32 of the body 22, as can be clearly identified in the drawings. It can be clearly seen in FIG. 1a how the holding plate 30 is fastened in the threaded bore 24 of the body 22 by means of a socket head screw 34.

As can also be seen in FIG. 1a, the winged screw 14 projects through a so-called keyhole opening 36 (FIG. 1e).

Figure 1H:
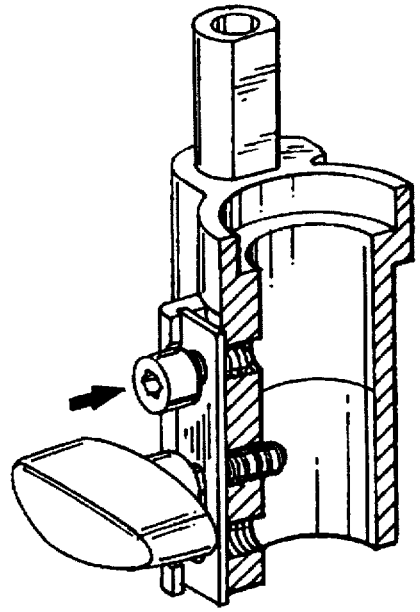

This keyhole opening consists of a central opening area 38, the diameter of which is adapted to the outer diameter of the threaded section 18, i.e. it is slightly larger so that the threaded section 18 can be inserted through this opening area 38. Directly adjacent to this opening area 38 are diametrically arranged oblong hole openings 40 and 42. These oblong hole openings have a cross-sectional area which is smaller than the outer diameter of the threaded section 18 but is suitable for receiving the shaft 20 of the winged screw 14, as can be clearly seen in FIG. 1a, according to which the shaft 20 lies in the oblong hole 42. The winged screw 14 is secured in this manner, i.e. it abuts with the threaded section against the plate if the winged screw should unintentionally loosen. Thus, it cannot unintentionally completely release itself from the mounting and fall from a great height onto the ground and possibly onto persons standing there. However, the holding plate 30 is at such a distance from the threaded bores 26 and 28 that a release of the fastening by means of the winged screw is possible but the winged screw cannot be screwed out completely. However, this spacing must not be provided when the shaft 20 has an appropriate length. It can be seen in the drawings and, in particular in FIG. 1e, that a further bore 44 is provided in the holding plate 30. This bore 44 is associated with the threaded bore 24 in order to secure the holding plate 30 to the body 22 of the mounting 10 by means of the socket head screw 34, as can be seen in FIG. 1a and also in FIG. 1h.

When the spotlight is to be fastened in the mounting 10 according to a different standard, this ensues according to the sequence of FIGS. 1a to 1h. It is to be emphasized in connection with this that the threaded bore 26 is associated with the oblong hole section 40 and the threaded bore 28 with the oblong hole section 42 of the keyhole opening 36.

Starting from FIG. 1a, first the socket head screw 34 is released, as can be seen in FIG. 1b. The holding plate 30 may thus be moved downwards, as seen in the drawings, until the threaded section 18 of the winged screw 14 is flush with the opening area 38 of the keyhole opening 36, as can be seen in FIG. 1c. In this position, the threaded screw can be completely screwed out of the threaded bore 28 and removed through the opening 38 of the holding plate 30, as can be seen in FIG. 1d. Following this, the holding plate 30 is displaced upwards into a position as can be seen in FIG. 1e. In this position, the opening area 38 is flush with the threaded bore 26, a threaded bore for a different fastening state. In accordance with the illustration in FIG. 1f, the winged screw 14 with its threaded section 18 can be inserted through the opening area 38 of the holding plate 30 into the threaded bore 26 and screwed in, which can be seen in FIG. 1f. When the winged screw is completely screwed in, the holding plate 30 is pushed downwards in accordance with the illustration in FIG. 1g so that the opening area 40 engages over the shaft 20 of the winged screw 14. Following this, this state is fixed in accordance with the illustration in FIG. 1h in that the socket head screw 34 is screwed through the bore 44 into the threaded bore 24 of the body 22 of the mounting 10.

What is claimed:

1. An apparatus comprising a fastening member (14) directly secured to a body (22) against falling, a holding part (30) provided between a body-sided part (18) of the fastening member (14) which effects the fastening of the fastening member (14) and an actuated part (16) of the fastening member (14), the holding part (30) having at least two openings (36; 44) arranged at a distance from one another, with at least one of the openings (36) comprising partial sections (38, 40, 42) of which one partial section (38) substantially corresponds in terms of its opening size to an outer dimension of the body-sided part (18) effecting the fastening and another partial section (40; 42) has an opening size which is smaller than the outer dimension of the body-sided part (18) effecting the fastening, and the other opening (44) being arranged to receive an additional fastening element (34) for securing the holding part (30) to the body (22), and the holding part (30) being arranged on the body (22) to be capable of changing position with respect to the body (22).

2. An apparatus according to claim 1, wherein the fastening member is a fastening screw (14) releasable without a tool.

3. An apparatus according to claim 2, wherein the fastening member (14) is a winged screw.

4. An apparatus according to claim 1, wherein the body-sided (18) of the fastening member (14) comprises a wider diameter than the another partial section (40; 42), such that when the fastening member (14) is secured to the body-sided part (22) by being positioned in the another partial section (40; 42), the fastening member (14) cannot be completely released from the holding part (30) even if the fastening member (14) should unintentionally loosen.

5. An apparatus according to claim 1, wherein the fastening member (14) is secured to the body (22) through the another partial section (40; 42) of smaller dimension.

6. An apparatus according to claim 1, wherein the body (22) comprises several threaded bores (24, 26, 28).

7. An apparatus according to claim 1, wherein the fastening member (14) comprises a shaft section (20) positioned between the actuated part (16) and body-sided part (18) thereof, with the body-sided part (18) having a larger outer diameter than the shaft section (20).

8. An apparatus comprising a fastening member (14) secured to a body (22) against falling, a holding part (30) provided between a body-sided part (18) of the fastening member (14) which effects the fastening of the fastening member (14) and an actuated part (16) of the fastening member (14), the holding part (30) having at least two openings (36; 44) arranged at a distance from one another, with at least one of the openings (36) comprising partial sections (38, 40, 42) of which one partial section (38) substantially corresponds in terms of its opening size to an outer dimension of the body-sided part (18) effecting the fastening and another partial section (40; 42) has an opening size which is smaller than the outer dimension of the body-sided part (18) effecting the fastening, the other opening (44) being arranged to receive an additional fastening element (34) for securing the holding part (30) to the body (22), the holding part (30) being arranged on the body (22) to be capable of changing position with respect to the body (22), wherein the holding part is an oblong holding plate (30).

9. An apparatus according to claim 8, wherein the fastening member is a screw (14).

10. An apparatus according to claim 8, wherein the fastening member is a fastening screw (14) releasable without a tool.

11. An apparatus according to claim 10, wherein the fastening member (14) is a winged screw.

12. An apparatus comprising
a fastening member (14) secured to a body (22) against falling,
a holding part (30) provided between a body-sided part (18) of the fastening member (14) which effects the fastening of the fastening member (14) and an actuated part (16) of the fastening member (14),
the holding part (30) having at least two openings (36; 44) arranged at a distance from one another,
with at least one of the openings (36) comprising partial sections (38, 40, 42) of which one partial section (38) substantially corresponds in terms of its opening size to an outer dimension of the body-sided part (18) effecting the fastening and another partial section (40; 42) has an opening size which is smaller than the outer dimension of the body-sided part (18) effecting the fastening, and
the other opening (44) being arranged to receive an additional fastening element (34) for securing the holding part (30) to the body (22), and
the holding part (30) being arranged on the body (22) to be capable of changing position with respect to the body (22), wherein
the holding part is an oblong holding plate (30),
the other opening (44) in the holding plate (30) constitutes a fastening hole (44) arranged for insertion thereinto of the additional fastening element (34) which is a positioning screw (34) which serves to hold the holding plate (30) on the body (22), and
the one partial section (38) constitutes an insertion hole (38) having a diameter adapted to receive a threaded outer diameter of the fastening member (14) which is a screw (14) such that the fastening screw (14) can be passed with a threaded part (18) thereof through the insertion hole (38),
the another partial section (40; 42) comprises at least one oblong hole (40; 42) of a smaller cross-sectional area than the threaded outer diameter of the fastening screw (14) and which borders the insertion hole (38),
the holding plate (30) is mounted to the body (22) to be displaceable substantially perpendicularly to an axis of the insertion hole (38), and
the body (22) comprises threaded bores (24; 26; 28) arranged at spacings of corresponding correlation with the holes (44; 40; 42) of the holding plate (30).

13. An apparatus according to claim 12, wherein the holding plate (30) is structured and arranged to be guided (32) in the body (22) in a manner capable of displacement.

14. An apparatus comprising
a fastening member (14) secured to a body (22) against falling,
a holding part (30) provided between a body-sided part (18) of the fastening member (14) which effects the fastening of the fastening member (14) and an actuated part (16) of the fastening member (14),
the holding part (30) having at least two openings (36; 44) arranged at a distance from one another,
with at least one of the openings (36) comprising partial sections (38, 40, 42) of which one partial section (38) substantially corresponds in terms of its opening size to an outer dimension of the body-sided part (18) effecting the fastening and another partial section (40; 42) has an opening size which is smaller than the outer dimension of the body-sided part (18) effecting the fastening, and
the other opening (44) being arranged to receive an additional fastening element (34) for securing the holding part (30) to the body (22), and
the holding part (30) being arranged on the body (22) to be capable of changing position with respect to the body (22), wherein
the fastening member is a screw (14),
the holding part is an oblong holding plate (30),
the other opening (44) in the holding plate (30) constitutes a fastening hole (44) arranged for insertion thereinto of the additional fastening element (34) which is a positioning screw (34) which serves to hold the holding plate (30) on the body (22),
the one partial section (38) constitutes an insertion hole (38) having a diameter adapted to receive a threaded outer diameter of the fastening member which is a fastening screw (14) such that the fastening screw (14) can be passed with the threaded part (18) thereof through the insertion hole (38),
the another partial section (40; 42) comprises at least one oblong hole (40; 42) of a smaller cross-sectional area than the threaded outer diameter of the fastening screw (14) and which borders the insertion hole (38),
the holding plate (30) is mounted to the body (22) to be displaceable substantially perpendicularly to an axis of the insertion hole (38), and
the body (22) comprises threaded bores (24; 26; 28) arranged at spacings of corresponding correlation with the holes (44; 40; 42) of the holding plate (30).

15. An apparatus according to claim 14, wherein the holding plate (30) is structured and arranged to be guided (32) in the body (22) in a manner capable of displacement.

16. An apparatus comprising a fastening member (14) secured to a body (22) against falling,
a holding part (30) provided between a body-sided part (18) of the fastening member (14) which effects the fastening of the fastening member (14) and an actuated part (16) of the fastening member (14),
the holding part (30) having at least two openings (36; 44) arranged at a distance from one another,
with at least one of the openings (36) comprising partial sections (38, 40, 42) of which one partial section (38) substantially corresponds in terms of its opening size to an outer dimension of the body-sided part (18) effecting the fastening and another partial section (40; 42) has an opening size which is Smaller than the outer dimension of the body-sided part (18) effecting the fastening, and
the other opening (44) being arranged to receive an additional fastening element (34) for securing the holding part (30) to the body (22), and
the holding part (30) being arranged on the body (22) to be capable of changing position with respect to the body (22), wherein
the fastening member is a fastening screw (14) releasable without a tool,
the holding part is an oblong holding plate (30),
the other opening (44) in the holding plate (30) constitutes a fastening hole (44) arranged for insertion thereinto of the additional fastening element (34) which is a positioning screw (34) which serves to hold the holding plate (30) on the body (22),
the one partial section constitutes an insertion hole (38) having a diameter adapted to receive a threaded outer diameter of the fastening member which is a fastening screw (14) such that the fastening screw (14) can be passed with the threaded part (18) thereof through the insertion hole (38), the another partial section (40; 42) comprises at least one oblong hole (40; 42) of a smaller cross-sectional area than the threaded outer diameter of the fastening screw (14) and which borders the insertion hole (38), the holding plate (30) is mounted to the body (22) to be displaceable substantially perpendicularly to an axis of the insertion hole (38), and the body (22) comprises threaded bores (24; 26; 28) arranged at spacings of corresponding correlation with the holes (44; 40; 42) of the holding plate (30).

17. An apparatus according to claim 16, wherein the holding plate (30) is structured and arranged to be guided (32) in the body (22) in a manner capable of displacement.

18. An apparatus comprising a fastening member (14) secured to a body (22) against falling, a holding part (30) provided between a body-sided part (18) of the fastening member (14) which effects the fastening of the fastening member (14) and an actuated part (16) of the fastening member (14).

the holding part (30) having at least two openings (36; 44) arranged at a distance from one another, with at least one of the openings (36) comprising partial sections (38, 40, 42) of which one partial section (38) substantially corresponds in terms of its openings size to an outer dimension of the body-sided part (18) effecting the fastening and another partial section (40; 42) has an opening size which is smaller than the outer dimension of the body-sided part (18) effecting the fastening, the other opening (44) being arranged to receive an additional fastening element (34) for securing the holding part (30) to the body (22), the holding part (30) being arranged on the body (22) to be capable of changing position with respect to the body (22), wherein the at least one opening (36) comprises three partial sections (38, 40, 42) with said one partial section (38) being a central partial section and said another partial section and a third partial section defining two diametrically-arranged partial sections (40, 42), said third particle section having an opening size which is smaller than the outer dimension of the body-sided part (18).

19. An apparatus according to claim 18, wherein the diametrically-arranged partial sections (40; 42) are each oblong-shaped.

20. An apparatus according to claim 18, wherein the body (22) comprises several threaded bores (24, 26, 28).

21. An apparatus according to claim 18, wherein the fastening member (14) comprises a shaft section (20) positioned between the actuated part (16) thereof and body-sided part (18) thereof, with said body-sided part (18) being threaded and having a larger outer diameter than the shaft section (20), and the diametrically-arranged partial sections (40, 42) each dimensioned to receive the shaft section (20) of the fastening element (14).

* * * * *